(12) United States Patent
Gould et al.

(10) Patent No.: US 8,996,442 B2
(45) Date of Patent: Mar. 31, 2015

(54) PROCESSING DATA USING VECTOR FIELDS

(71) Applicant: AB Initio Technology LLC, Lexington, MA (US)

(72) Inventors: Joel Gould, Arlington, MA (US); Scott Studer, Georgetown, MA (US)

(73) Assignee: AB Initio Technology LLC, Lexington, MA (US)

( * ) Notice: Subject to any disclaimer, the term of this patent is extended or adjusted under 35 U.S.C. 154(b) by 0 days.

(21) Appl. No.: 13/928,475

(22) Filed: Jun. 27, 2013

(65) Prior Publication Data

US 2013/0297629 A1 Nov. 7, 2013

Related U.S. Application Data

(63) Continuation of application No. 12/696,667, filed on Jan. 29, 2010, now Pat. No. 8,478,706.

(60) Provisional application No. 61/148,888, filed on Jan. 30, 2009.

(51) Int. Cl.
*G06F 15/18* (2006.01)
*G06N 5/02* (2006.01)
*G06F 17/30* (2006.01)

(52) U.S. Cl.
CPC .......... *G06F 17/30292* (2013.01); *G06N 5/025* (2013.01)
USPC ........................................................ 706/47

(58) Field of Classification Search
USPC ....................................................... 706/47
See application file for complete search history.

(56) References Cited

U.S. PATENT DOCUMENTS

| | | | |
|---|---|---|---|
| 5,615,359 | A | 3/1997 | Yung |
| 5,734,886 | A | 3/1998 | Grosse et al. |
| 5,832,497 | A | 11/1998 | Taylor |
| 5,966,072 | A | 10/1999 | Stanfill et al. |
| 6,477,520 | B1 | 11/2002 | Malaviya et al. |

(Continued)

FOREIGN PATENT DOCUMENTS

| | | |
|---|---|---|
| CN | 101208695 | 6/2008 |
| CN | 101438280 | 5/2009 |

(Continued)

OTHER PUBLICATIONS

A Vector Operation Based Fast Association Rules Mining Algorithm, Liu Zhi; Sang Guoming; Lu Mingyu Bioinformatics, Systems Biology and Intelligent Computing, 2009. IJCBS '09. International Joint Conference on DOI: 10.1109/IJCBS.2009.19 Publication Year: 2009, pp. 561-564.*

(Continued)

*Primary Examiner* — Michael B Holmes
(74) *Attorney, Agent, or Firm* — Occhiuti & Rohlicek LLP

(57) ABSTRACT

Disclosed is a method including receiving a rule having at least one rule case for producing an output value based on one or more input values, generating a transform for receiving data from an input dataset and transforming the data based on the rule including producing a first series of values for at least one output variable in an output dataset, at least one value in the first series of values including a second series of values, and providing an output field corresponding to the at least one output variable in the output dataset for storing the second series of values.

108 Claims, 11 Drawing Sheets

(56) References Cited

U.S. PATENT DOCUMENTS

| | | | |
|---|---|---|---|
| 6,728,879 B1 | 4/2004 | Atkinson | |
| 6,782,374 B2 | 8/2004 | Nichols | |
| 7,020,869 B2 | 3/2006 | Abrari et al. | |
| 7,164,422 B1 | 1/2007 | Wholey, III et al. | |
| 7,461,042 B2 | 12/2008 | Long et al. | |
| 7,565,642 B2 | 7/2009 | Moore et al. | |
| 7,756,873 B2* | 7/2010 | Gould et al. | 707/737 |
| 7,849,075 B2* | 12/2010 | Gould et al. | 707/714 |
| 8,032,501 B2* | 10/2011 | Bone et al. | 707/694 |
| 8,064,672 B2* | 11/2011 | Narayanan et al. | 382/131 |
| 8,069,129 B2* | 11/2011 | Gould et al. | 706/47 |
| 8,073,801 B1 | 12/2011 | von Halle et al. | |
| 8,086,553 B2* | 12/2011 | Bone et al. | 706/47 |
| 8,122,367 B2* | 2/2012 | Krieger et al. | 715/764 |
| 8,190,562 B2* | 5/2012 | Sanghvi et al. | 707/610 |
| 8,301,413 B2* | 10/2012 | Napolin et al. | 702/182 |
| 8,332,740 B2* | 12/2012 | Graham | 715/200 |
| 8,347,207 B2* | 1/2013 | Borgsmidt et al. | 715/231 |
| 8,380,651 B2* | 2/2013 | Gould et al. | 706/47 |
| 8,386,408 B2* | 2/2013 | Gould et al. | 706/47 |
| 8,417,678 B2* | 4/2013 | Bone et al. | 707/694 |
| 8,438,533 B2* | 5/2013 | Fritzsche et al. | 717/104 |
| 8,468,125 B2* | 6/2013 | Tarnoff et al. | 707/610 |
| 8,478,706 B2* | 7/2013 | Gould et al. | 706/47 |
| 8,571,317 B2* | 10/2013 | Welling et al. | 382/173 |
| 8,612,404 B2* | 12/2013 | Bone et al. | 707/694 |
| 8,645,434 B2* | 2/2014 | Carter et al. | 707/804 |
| 8,725,660 B2* | 5/2014 | Forman et al. | 706/12 |
| 8,897,563 B1* | 11/2014 | Welling et al. | 382/173 |
| 8,898,101 B2* | 11/2014 | Bone et al. | 706/50 |
| 2002/0049777 A1 | 4/2002 | Terayama et al. | |
| 2003/0120593 A1 | 6/2003 | Bansal et al. | |
| 2004/0034848 A1 | 2/2004 | Moore et al. | |
| 2004/0085357 A1 | 5/2004 | Childress et al. | |
| 2004/0088196 A1 | 5/2004 | Childress et al. | |
| 2004/0103366 A1 | 5/2004 | Peyton-Jones et al. | |
| 2004/0210661 A1 | 10/2004 | Thompson | |
| 2005/0038764 A1 | 2/2005 | Minsky et al. | |
| 2005/0086360 A1 | 4/2005 | Mamou et al. | |
| 2005/0246686 A1 | 11/2005 | Seshadri et al. | |
| 2006/0095466 A1 | 5/2006 | Stevens et al. | |
| 2006/0112061 A1 | 5/2006 | Masurkar | |
| 2006/0288046 A1 | 12/2006 | Gupta et al. | |
| 2006/0294150 A1 | 12/2006 | Stanfill et al. | |
| 2007/0021995 A1 | 1/2007 | Toklu et al. | |
| 2007/0050340 A1 | 3/2007 | von Kaenel et al. | |
| 2008/0059436 A1 | 3/2008 | Crocker | |
| 2008/0256014 A1 | 10/2008 | Gould et al. | |
| 2009/0319832 A1 | 12/2009 | Zhang | |
| 2012/0059784 A1 | 3/2012 | Gould et al. | |
| 2012/0066549 A1 | 3/2012 | Gould et al. | |

FOREIGN PATENT DOCUMENTS

| | | |
|---|---|---|
| JP | H01-277939 | 11/1989 |
| JP | H02-275539 | 11/1990 |
| JP | 04-352029 | 12/1992 |
| JP | H06-266860 | 9/1994 |
| JP | 2003-030470 | 1/2003 |
| JP | 2003-208307 | 7/2003 |
| JP | 2005-018523 | 1/2005 |
| JP | 2008-512794 | 4/2008 |
| JP | 2008-547086 | 12/2008 |
| JP | 2010-524134 | 7/2010 |
| WO | WO 01/86592 | 11/2001 |
| WO | WO 2006/031640 | 3/2006 |
| WO | WO 2006/138044 | 12/2006 |
| WO | WO 2008/124319 | 10/2008 |

OTHER PUBLICATIONS

Rule Extraction from Support Vector Machines: Measuring the Explanation Capability Using the Area under the ROC Curve Barakat, N.; Bradley, A.P. Pattern Recognition, 2006. ICPR 2006. 18th International Conference on vol. 2 DOI: 10.1109/ICPR.2006. 1021 Publication Year: 2006, pp. 812-815.*

A Product Recommendation System Using Vector Space Model and Association Rule Mukhopadhyay, D.; Ruma Dutta; Kundu, A.; Dattagupta, Rana Information Technology, 2008. ICIT '08. International Conference on DOI: 10.1109/ICIT.2008.48 Publication Year: 2008, pp. 279-282.*

A New Association Rules Mining Algorithm Based on Vector, Xin Zhang; Pin Liao; Huiyong Wang Genetic and Evolutionary Computing, 2009. WGEC '09. 3rd International Conference on DOI: 10.1109/WGEC.2009.64 Publication Year: 2009, pp. 429-432.*

Automated optimization of data-path design by improving circuit area and critical time through adaptive transformation Saqib, S.; Bin Ali, U.; Ali, W.; Khan, S.A. Intelligent Systems Design and Applications (ISDA), 2010 10th International Conference on DOI: 10.1109/ISDA.2010.5687122 Publication Year: 2010, pp. 1493-1498.*

Automated Removal of EKG Artifact From EEG Data Using Independent Component Analysis and Continuous Wavelet Transformation Hamaneh, M.B.; Chitravas, N.; Kaiboriboon, K.; Lhatoo, S.D.; Loparo, K.A. Biomedical Engineering, IEEE Transactions on vol. 61, Issue: 6 DOI: 10.1109/TBME.2013.2295173 Publication Year: 2014, pp. 1634-1164.*

Data dependence based testability transformation in automated test generation Korel, B.; Harman, M.; Chung, S.; Apirukvorapinit, P.; Gupta, R.; Zhang, Q. Software Reliability Engineering, 2005. ISSRE 2005. 16th IEEE International Symposium on DOI: 10.1109/ISSRE. 2005.16 Publication Year: 2005, p. 10 pp. 254.*

Automated measures for interpretable dimensionality reduction for visual classification: A user study, Icke, I.; Rosenberg, A. Visual Analytics Science and Technology (VAST), 2011 IEEE Conference on DOI: 10/1109/VAST.2011.6102474 Publication Year: 2011, pp. 281-282.*

Affidavit Pursuant to 37 CFR 1.56 signed by Craig W. Stanfill on Sep. 23, 2009, 2 pages.

"ILog JRules: Leading the Way in Business Rule Management Systems," White Paper. *ILog Business Rules*, Mar. 2005, 15 pages.

ILOG JRules Performance Analysis and Capacity Planning, ILOG Business Rules Product Management, Version 1.0, Sep. 2005, 16 pages.

ILOG, "Enrich the Decisioning of Your COBOL Applications," Jun. 2008, pp. 3-8.

Owen, James. "Clash of the Java rule Titans," InfoWorld <http://www.infoworld.com>, Jul. 17, 2006, 4 pages.

PCT International Search Report and Written Opinion dated Jul. 9, 2008. International Application No. PCT/US2008/058360, 14 pages.

International Search Report & Written Opinion in PCT application No. PCT/US09/49299 mailed Aug. 12, 2009, 7 pages.

International Search Report & Written Opinion issued in PCT Application No. PCT/US10/22593, mailed Mar. 12, 2010, 8 pages.

Japanese Office Action, with English Translation, JP Application No. 2010-503118, Aug. 30, 2012, 8 pages.

Chinese Office Action, with English translation, CN Application No. 200980133372.9, mailed Dec. 9, 2013, 16 pages.

Japanese Office Action, with English Translation, JP Application No. 2013-155253, Jun. 25, 2014, 5 pages.

Shiga, et al., "Implementation for Converting Business-Rule to Dynamic Constraint Expression in Electronic Commerce," Information Processing Society of Japan Research Report, Japan, Information Processing Society of Japan, Jul. 15, 2004, vol. 2004, Issue 72, p. 639-644.

Notice of Reasons for Rejection, Japanese Application No. 2014-035624, mailed Dec. 19, 2014 (7 pages with English Language translation).

\* cited by examiner

| | Total frequent flyer miles | Current year frequent flyer miles | Class of seat | Row of seat | Boarding Group |
|---|---|---|---|---|---|
| 210a | >=1,000,000 | | | | 1 |
| 210b | | | first | | 1 |
| 210c | >=100,000 | >=lat year frequent flyer miles | | | 2 |
| 210d | | | business | | 2 |
| 210e | | | else | <=10 | 2 |
| 210f | | | same | <=40 | 3 |
| 210g | | | same | <=50 | |
| 210h | | | same | else | 5 |

FIG. 3

| | Year | Vehicle Value | Premium Vehicle | If True | Valid Vehicle | Vehicle Validation Message |
|---|---|---|---|---|---|---|
| | | | | | | Outputs (504) |
| | | Triggers | | | | |
| 1 | >2004 | <15000 | No | *Seat Material = | No | "Vehicle value too low to have.." |
| 2 | | → | any | *Four Wheel... | | "Vehicle value too low to have.." |
| 3 | | any | Yes | *Power Wind... | | "Recent premium vehicles al..." |
| 4 | any | any | any | *On Star = Yes | | "Vehicle value too low to have..." |
| 5 | <2000 | any | any | *Ipod Jack = Ye | | "Vehicle too old to have had a..." |
| 6 | <1990 | any | any | *CD Changer = Y | | "Vehicle too old to have had a..." |
| 7 | <2004 | any | any | *Blue Tooth E... | | "Vehicle to old to have had a..." |
| 8 | else | any | Yes | | | "Recent premium vehicles ha..." |
| 9 | <1995 | any | any | *Car Color in M | | "Vehicle too old to have had ...." |
| 10 | <1900 | any | any | any | → | "Vehicle too old to insure." |
| 11 | any | any | any | any | Yes | *default value* |
| * | | | | | | |

FIG. 5

| | Name | Type | Name of Constants | Default Value | Output Type | Max Count | Technical Name in Dataset: "Dataset 1" | Descr |
|---|---|---|---|---|---|---|---|---|
| 1 | ⊞ Name Valid | String | 0 | "Yes" | Write Once | | name_valid | |
| 2 | ⊞ Name Validation Message | String | 0 | null | Accumulator | 20 | name_valid | |
| | *New variable* | | | | | | | |

FIG. 6

⌀ Validate Request and Compute Quote Ruleset — 700

File  Edit  View  Ruleset  Tools  Window  Help

| | R: Validate Vehicle* | DEP: Default Deployment* | Test Mode: File Test ▼ | Deployment: Default Deployment ▼ |
| Results | | R: Validate Person* | Home |

Fire Many Rule – "Validate Person"  (704)          Ruleset – "Validate R

⊞ ABOUT

⊟ CASES GRID (All true cases will fire)                                708

| | Triggers | Accumulator Outputs | |
|---|---|---|---|
| | IF TRUE ▲ | Person Validation Message | Times Fired |
| 1 | *string_length(First Name)<3 | "Invalid first name" | 53 |
| 2 | *string_length(Last Name)<3 | "Invalid last name" | 11 |
| 3 | *Year Of Birth<1937 | "Invalid too old to insure" | 1083 |
| 4 | *Year Of Birth<1991 | "Individual too young to insure" | 322 |
| 5 | *(2007 – Year OF Birth) < Number 0 | "Individual is too young to have that" | 91 |
| 6 | any | | 8440 |
| * | | | |

712 — Fire Many

FIG. 7

```
record
    decimal 1 (2) num_drivers;    // Number of Drivers
    record
        string (20) name;          // Driver Name         950
        string (1) sex;            // Driver Sex
        decimal (3) age;           // Driver Age
        decimal (2) points;        // Driver Points
    end driver [num_drivers];
    decimal (2) num_vehicles;      // Number of Vehicles
    record
        decimal (10) value;        // Vehicle Value
        decimal (2) age;           // Vehicle Age
        decimal (1) airbag;        // Vehicle has Air bag
        decimal (1) has belt;      // Vehicle has Seat Belts
        decimal (20) driver;       // Vehicle Primary Driver
    end driver [num_vehicles];
    decimal (2) geo_risk;          // Geographic Adjustment
end;
```

FIG. 10A

```
<record>
  <drivers>
    <driver name="Fred" sex="M" age="35" points="12" />
    <driver name="Wilma" sex="F" age="33" points="9" />
    <driver name="Pebbles" sex="F" age="21" points="14" />
    <driver name="BamBam" sex="M" age="22" points="13" />
  </drivers>
  <vehicles>
    <vehicle value="1000" age="4" air_bag="0" has_belt="0" drivers="Fred" />
    <vehicle value="1500" age="2" air_bag="1" has_belt="1" drivers="Pebbles" />
    <vehicle value="1200" age="6" air_bag="0" has_belt="1" drivers="Wilma" />
  </vehicles>
  <geo_risk value="80" />>
<record>
```

PROCESSING DATA USING VECTOR FIELDS

CROSS-REFERENCE TO RELATED APPLICATIONS

This application is a continuation application and claims priority under 35 U.S.C. §120 to U.S. patent application Ser. No. 12/696,667 filed on Jan. 29, 2010, to be issued as U.S. Pat. No. 8,478,706 on Jul. 2, 2013, which claims benefit under U.S.C. §119(e) to U.S. Provisional Application 61/148,888, filed on Jan. 30, 2009. The above applications are incorporated herein by reference.

BACKGROUND

This description relates to processing data using vector fields.

Some computing systems provide an interface for specifying rules that are used for automated decision making in various data processing applications. Decisions associated with processing data representing credit card transactions or airline frequent flyer programs, for example, may be governed by a given set of rules. In some cases, these rules are described in human-readable form. The computing system may provide an interface for a user to define or edit these rules, and then incorporate the rules into a data processing system.

SUMMARY

In one aspect, in general, a method includes receiving a rule having at least one rule case for producing an output value based on one or more input values, generating a transform for receiving data from an input dataset and transforming the data based on the rule including producing a first series of values for at least one output variable in an output dataset, at least one value in the first series of values including a second series of values, and providing an output field corresponding to the at least one output variable in the output dataset for storing the second series of values.

Aspects can include one or more of the following features.

The transform can be included in a component of a graph-based application represented by a graph, with vertices in the graph representing components, and directed links between vertices in the graph represent flows of data between components.

A first graph component including the transform can provide a flow of data to the transform from the input dataset.

The first graph component can be an executable computation component, and the graph can include a second graph component that is a data storage component representing the input dataset.

Producing a first series of values for at least one variable in an output dataset can include producing rows for an output table, each row defining a record having values for a set of variables including the output variable.

Providing an output field for storing the second series of values can include providing an array for storing a predetermined number of the second series of values, the predetermined number being a default number that is modifiable to a user-specified number. The output field can include a cell in a table.

Receiving the rule can include receiving at least a row of a rule table, the row corresponding to a rule case, and having an output including one or more or a combination of the input values, a predetermined value, or a value computed from one or more of the input values.

The rule case can include one or more of: having an input value equal to a threshold, having an input value above a threshold, having an input value below a threshold, having an input value belonging to a set of values, having an input value matching a pattern of values, having a relationship to another input value, having a relationship to an output value of another set of rules, or having a relationship to a value in a memory.

The input dataset can include records having values for scalar variables and vector variables. At least one of the records can include an array for storing a predetermined number of records, the predetermined number being a default number that is modifiable to a user-specified number. At least one of the records includes an internal reference table to define key relationships to sub-records in the at least one of the records.

The method can also include, in response to a rule, producing the second series of values for the output variable in the output dataset based on the key relationships in the internal reference table.

The method can also include, in response to a rule case in a rule, triggering the rule case to produce a value for the output variable in the output dataset. Triggering a rule case can include triggering the rule based on a scalar value in the input dataset satisfying the at least one rule case in the rule.

Triggering a rule case can include triggering the rule based on each value in a vector in the input dataset satisfying the at least one rule case in the rule.

Triggering a rule case can include triggering the rule case based on an output of an aggregate function applied to a vector in the input dataset satisfying the at least one rule case in the rule.

Generating the transform can include converting each of a plurality of rule cases in the rule to a logical expression to form a plurality of logical expressions, and compiling the plurality of logical expressions into computer-executable code.

Compiling the plurality of logical expressions can include one or more of combining expressions, optimizing individual expressions, and optimizing groups of expressions.

In another aspect, in general, a computer-readable medium storing a computer program for updating a component in a graph-based computation having data processing components connected by linking elements representing data flows includes instructions for causing a computer to receive a rule having at least one rule case for producing an output value based on one or more input values, generate a transform for receiving data from an input dataset and transforming the data based on the rule including producing a first series of values for at least one output variable in an output dataset, at least one value in the first series of values including a second series of values, and provide an output field corresponding to the at least one output variable in the output dataset for storing the second series of values.

In another aspect, a system includes a means for receiving a rule having at least one rule case for producing an output value based on one or more input values, a processor configured to generate a transform for receiving data from an input dataset and transforming the data based on the rule including producing a first series of values for at least one output variable in an output dataset, at least one value in the first series of values including a second series of values, and a means for providing an output field corresponding to the at least one output variable in the output dataset for storing the second series of values.

Other features and advantages of the invention will become apparent from the following description, and from the claims.

DESCRIPTION OF DRAWINGS

FIGS. 3 and 4 are example rule sets.
FIG. 5 is an example Fire-Many rule set.
FIGS. 6, 7, and 8 are example output, rule, and result tabs.
FIGS. 10A and 10B show an example input record having record vectors.

DESCRIPTION

Figure 1:
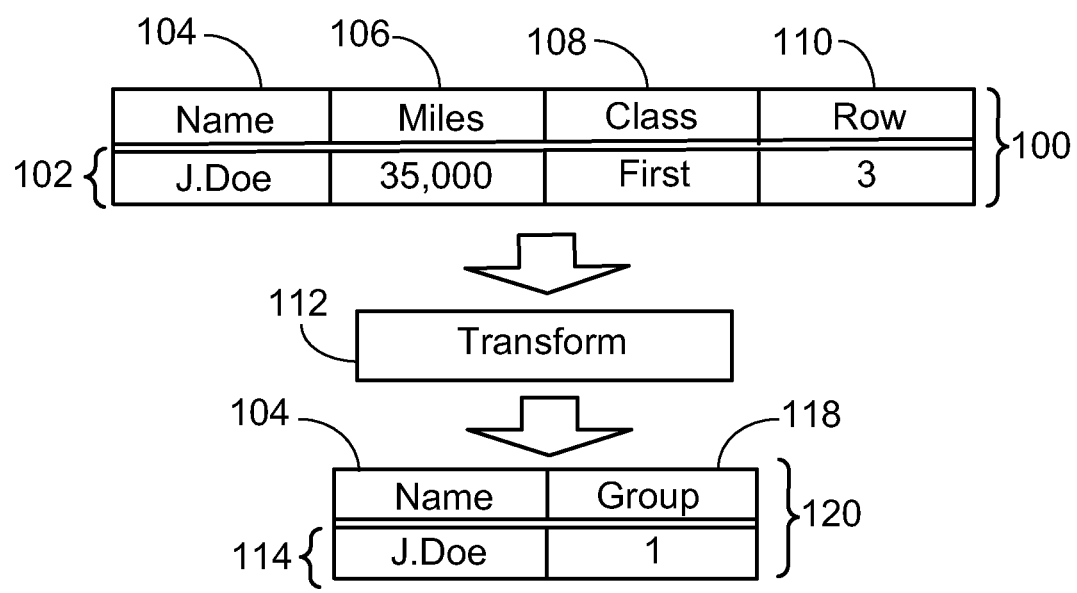
FIG. 1 is a schematic depicting an example transform.

A business rule can be expressed as a set of criteria that can be used to, for example, convert data from one format to another, make determinations about data, or generate new data based on a set of input data. For example, in FIG. 1, a record 102 in a flight reservation system indicates a passenger's name 104, miles 106 the passenger has flown in the current year, class 108 of the passenger's ticket, and the passenger's current row 110 in an airline. A business rule may indicate that such the passenger should be classified within boarding group "1," e.g., group 118. A business rule is generally easy for a human to understand, e.g., "first class passengers are in group 1," but may need to be translated into language that a computer can understand before it can be used to manipulate data. Accordingly, to implement the business rule, a transform 112 is generated to receive an input record, e.g., record 102, from one or more data sources, e.g., input dataset 100, and produce an output record, e.g., record 114, indicating the passenger's name 104 and group 118, into an output dataset 120. Input and output datasets are also referred to as data streams.

To simplify creation of a transform 112 for non-technical users, typically an editor tool (not shown) is provided to input a set of business rules, referred to as a rule set, or a set of rules, in a format familiar to the users. The set of rules, in turn, instructs a computer system to generate the transform 112 which further instructs the computer system what to do with input dataset 100, and what to produce into output dataset 120. A rule or rule set that corresponds to a single transform can include one or more rule cases that compute different values for a rule set's output variables depending on an input record. When a rule case in a rule is triggered, the rule, and more particularly, the rule case, is regarded to be fired. For example, only one rule case in a rule can be filed. In some examples, more than one rule case in a rule can be filed. In some examples, when a rule case is fired, the entire rule can be regarded as being fired. In some implementations, a rule case or rule is triggered or fired if, for example, an input scalar or vector value in an input dataset satisfies one or more conditions in the rule case or rule. A rule set can also include other rules sets. The other rule sets can produce values for additional or alternative output variables. For example, a rule set can directly contain or indirectly refer to other rule sets, referred to as "included" rule sets.

Figure 2:
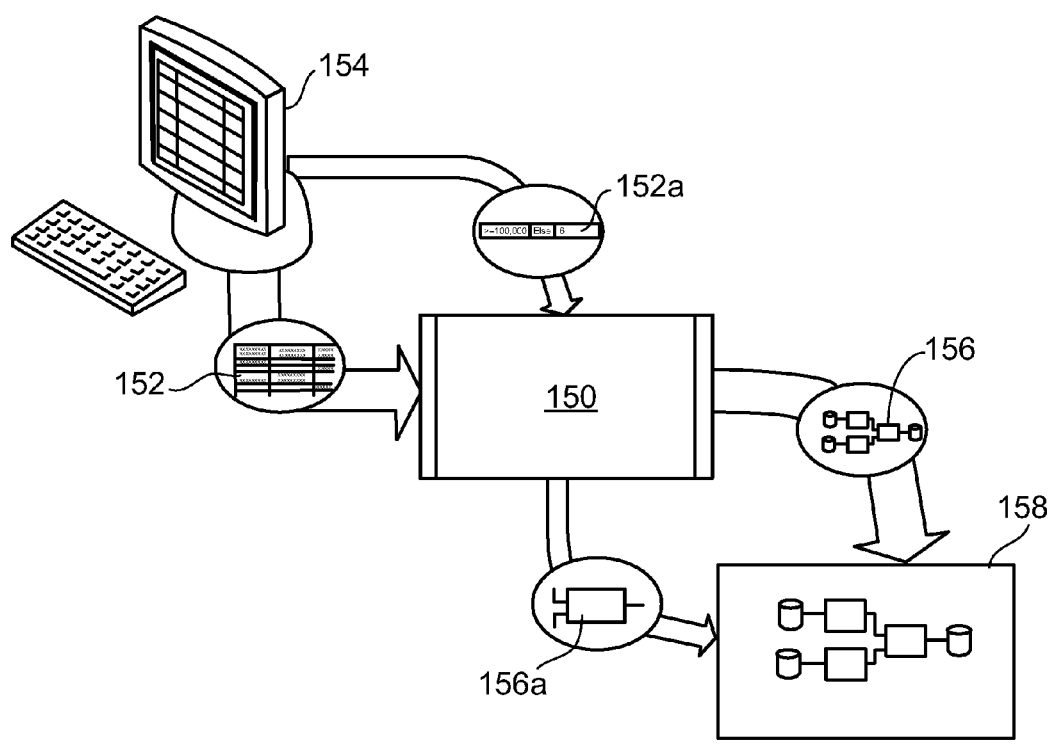
FIG. 2 is an example transform generator.

An example transform generation system is shown in FIG. 2. A generator 150 receives as input a rule set 152 from an editor 154 and generates a transform 156. The generated transform 156 may be provided to a graph-based computation system 158 as a component to be used in a graph or as an entire graph itself, depending on the system's architecture and the purpose of the transform and the business rules. The graph-based computation system 158 can provide a computation environment that allows a programmer to build a graph-based application by using components as building blocks. A graph-based application is often represented by a directed graph, with vertices in the graph representing components (either data storage components or executable computation components), and the directed links or "edges" in the graph representing flows of data between components. A dataflow graph (also called simply a "graph") is a modular entity. Each graph can be made up of one or more other graphs, and a particular graph can be a component in a larger graph.

The generator 150 can be, for example, a compiler, a custom-built program, or a graph-based computation configured using standard tools to receive the rule set 152 and output the transform 156. Any technique for producing, and subsequently updating the transform 156 known to those skilled in the art can be used to generate transform 156. For example, a technique for producing transforms is described in U.S. patent application Ser. No. 11/733,434, entitled "Editing and Compiling Business Rules," filed Apr. 10, 2007, and incorporated herein by reference in its entirety.

In some examples, the transform 156 generates only one value for an output variable corresponding to an input record 102. In such a scheme, a rule set can fire at most only once. Accordingly, some problems, e.g., data quality problems, may not be easily implemented using the transform 156. In some examples, output variables in an output dataset 120 can include "Write-Once Outputs." In general, "Write-Once Outputs" are output variables that are typically written to once for a given input record, and store only one value for the given input record. Rule sets that produce such variables are called "Fire-Once" rules.

In some examples, a "Fire-Many" rule can produce "accumulator" output variables, e.g., variables that are capable of receiving a series of values for a given input record, instead of only one value. A "Fire-Many" rule would fire for every rule case within a rule set that is triggered for that input record, and not just, for example, the first rule case that is triggered.

In some examples, a rule set can be entered in a tabular (or "spreadsheet") format, as shown in FIG. 3, with rows and columns that intersect in cells. Trigger columns 202, 204, 206, 208 in table 200 correspond to criteria for available input data values, and rows 210a-h correspond to rule cases, i.e., sets of criteria that relate to the available input data values. A cell at the intersection of a trigger column and the applicable rule case row 210n contains a criterion for that trigger column and rule case. A rule case 210n applies to a given record, e.g., 102 in FIG. 1, if data values of the record 102, for each trigger column in which the rule case has criteria, meets the triggering criteria. If a rule case 210n applies, output is generated based on one or more output columns 212. As described above, in general, a rule case that has all of its input relationships satisfied may be referred to as "triggered," and the rule set is referred to as "fired." Each output column 212 corresponds to a potential output variable, and the value in the corresponding cell at the intersection of the column 212 and the applicable rule case row 210n determines the output, if any, for that variable. In some examples, the cell can contain a value that is assigned to the variable or it can contain an expression that is evaluated to generate the output value, as discussed below. In some examples, there may be more than one output column, though only one is shown in FIG. 3.

There may be several different types of trigger columns, including columns that correspond to a variable, columns that contain expressions but are calculated once and then treated like variables, and columns that only contain expressions. Columns that only contain expressions are in some respects simpler than those corresponding to or treated as variables.

Such trigger columns can contain, for example, one of the following types of cell values for defining trigger column criteria:

- An expression. The condition will be considered to be true if the evaluation of the expression evaluates to a non-zero, or non-NULL value.
- The keyword "any," or an empty string. The condition is always true. Each empty cell in a trigger column is equivalent to one explicitly containing the keyword "any."
- The keyword "else." The condition is true if none of the cells above the cell containing "else" is true, in rows where all cells to the left are identical.
- The keyword "same". The condition is true if the cell above is true.

Columns that correspond to a variable (column variables) can have two types of cells. One type of cell is an expression cell. Those cells behave exactly like cells in a column that contains only expressions, described above. However, the keyword "this" can be used in the expression to refer to the column variable. The other type of cell is a comparison value. An example grammar for comparison values is as follows:

```
comparison_value ::= compound_value ( "or" compound value )*
compound_value ::= simple_value ( "and" simple_value )*
simple_value ::= [ "not" ] ( value_expression | simple_function | membership_expr )
value_expression ::= [ operator ] value_element
operator ::= ">" | "<" | ">=" | "<=" | "!=" | "=" | "equals"
value_element ::= constant | constant | variable | "("expression ")"
simple_function ::= "is_null" | "is_blank" | "is_valid" | "is_defined" | "is_bzero"
membership_expr ::= "in" "[" value_element ( ( "," | "to" | "or" ) value_element)* "]"
where a "*" means a term is repeated zero or more times.
```

Any suitable programming language or syntax may be used. Examples include C, Java, DML, or Prolog. The column variable is compared against the comparison value according to the operator, function, or membership expression. In the example of FIG. 3, the first two columns 202 and 204 contain comparison values with the ">=" operator. Accordingly, the criteria is met if the value for that column is greater than or equal to the corresponding number. If there is no operator, as in the "Class of Seat" column, then "equals" is assumed. A constant can be any legal constant in whatever programming language or syntax is used in the underlying system. An expression is any legal expression in the language being used that returns a compatible datatype that will be compared against the column variable. In some examples, expressions inside comparison values are enclosed in parenthesis to avoid ambiguity.

In the example of FIG. 3, the first row 210a has criteria in only one column, 202, which indicates that if the total number of frequent flier miles for a traveler is greater than 1,000,000, then that rule case applies regardless of what value any other columns may have. In that case, the "Boarding Group" output variable for that user is set to group 1. Likewise, the second rule case 210b indicates that any flier in first class is in group 1. In some examples, the rules are evaluated in order, so a traveler having over 1,000,000 miles and a first class ticket will be in group 1, but only the first rule case 210a will be triggered.

Figure 4:
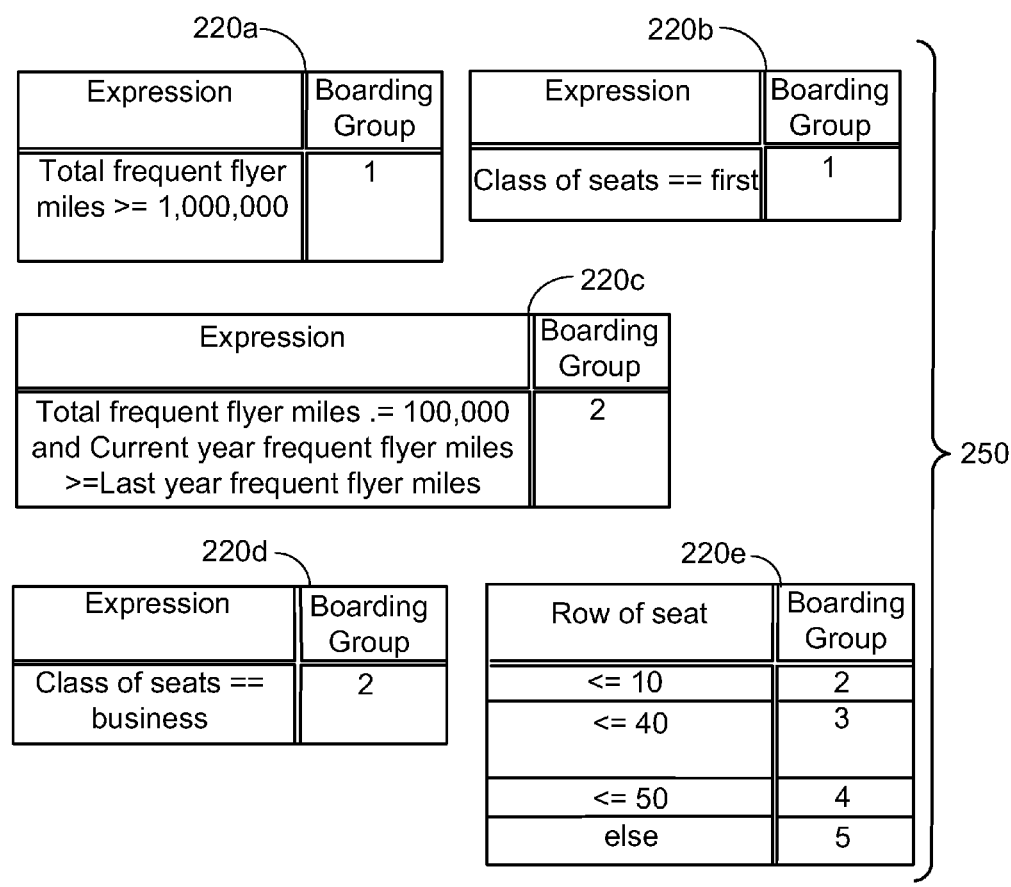

The rule cases 210a-h (FIG. 3) can also be represented as individual simple rules, each in their own table, as shown in FIG. 4. Rules 220a-d corresponds to rows 210a-d of FIG. 3, respectively, while rule 220e has four rule cases corresponding to rows 210e-h together. A user could create these individual rules separately, rather than generating the entire table shown in FIG. 3. Each rule case contains a value (at least implicitly) for every trigger column and a value for every output column (the value can be blank, i.e., effectively set to "any"). When multiple rules generate the same output, the rules are ordered and they are considered in order until a rule case in one rule triggers on the inputs and generates an output. If no rule case in a rule triggers, the next rule that produces the same output is processed. If no cases in any rule trigger for an output, a default value is used.

In some examples, a user interface of the editor tool can be used to graphically identify cells that contain expressions. Accordingly, a user can understand the difference between an expression that will be evaluated to true or false on its own and an expression that returns a value that is compared against the column variable. When the user is typing, he can indicate that a particular cell is to be an expression cell by, for example, typing an asterisk at the beginning.

For columns that correspond to output variables, the cells can contain one of the following:

- A value. The value that will be assigned to the output variable
- An expression. The value of the expression is assigned to the output variable. If the expression evaluates to NULL then the field gets the NULL value, unless the output field is not-nullable. In which case, an error is generated.
- The keyword "null". If the output field is nullable, then the field will be assigned NULL. Otherwise, an error is generated.
- An empty string. If the output field has a default value, then the default value is assigned. Otherwise, the cell is treated as if it contains the keyword "null".
- The keyword "same". The output field is assigned the same value computed in the cell above.

In addition to expressions, users can be allowed to attach comments to any cell in the rule, which can be displayed in response to user interaction (e.g., clicking or "hovering" a pointer).

In some implementations, a rule set, e.g., the rule set shown below in Table 1, can include multiple rule cases that generate multiple output records for a single input record.

TABLE 1

| Trigger: Automobile Option | Trigger: Budget | Output: Trim Level |
|---|---|---|
| Honda S2000 | >=37000 | S2000 CR |
| Honda S2000 | else | S2000 |
| Honda Accord Coupe | >=29000 | Accord Coupe EX-L V-6 |
| Honda Accord Coupe | >=26000 | Accord Coupe EX-L |
| Honda Civic Sedan | >=24000 | Accord Coupe EX |
| Honda Element | any | Accord Coupe |
| . . . | . . . | . . . |

The rule set above considers a family's automobile options in view of the family's budget, and outputs a trim level for the automobile. In some examples of such a rule set (referred to as a "normalize rule set"), at least one of the output values is identified as a key output value, e.g., "S2000 CR." When the rules that compute the key output value "S2000 CR" are evaluated, the rule case (Automobile Option: Honda S2000 and Budget: >=37000) that triggered on the input data record to generate the output value "S2000 CR" is noted. The rule set is then evaluated again with the previously-triggered rule case (Automobile Option: Honda S2000 and Budget: >=37000) disabled to see if any other rule cases trigger and produce an output value. The process described above is repeated until no additional rule cases are triggered. Each output value is stored as a separate output record. In some examples, rule cases are grouped, such that if one triggers, others in its group are also disabled on the next iteration for the same input record.

In some examples, the transform corresponding to the normalize rule set can use two stages of processing. First, an input record is read and a count is computed, e.g., by calling a "length" function. The count corresponds to a number of output records that will be generated. Then, another function, i.e., "normalize" function, is called for each output record. The normalize function receives a copy of the input record and a current index from the count produced by the length function and produces output values into different output records. For example, if the input record had a family size of four (4) and a budget of $20,000, the transform generates three output records, one for each of the three suggested cars (Accord Sedan, Civic, and Element).

In some implementations, the transform calculates all possible values for the Automobile Option, using the "length" function so that the number of output records is known. Once the transform has calculated all possible Automobile Output values, the transform can then call the "normalize" function as many times as there are output records, to assign values to each of the output records.

In some implementations, instead of the two stage processing described above, the transform can calculate all possible values for the Automobile Option by calling the "normalize" function directly several times until there are no more values to compute.

FIG. 5 is an example rule set 500 for generating multiple values 504 for an output variable 508. A user may be interested in knowing all of the reasons why a specific vehicle is considered invalid, not just the first reason. In some examples, as shown in FIG. 6, a first step is for the user to specify, using an output tab 600 in a user interface of the editor, that the rule set 500 produces multiple output values 504.

As such, the user indicates that the output variable 508 "Name Validation Message" is an accumulator variable for receiving a series of values 504. The Output Type 604 corresponding to the output variable 508 changes to indicate "accumulator" 608.

In some examples, scalar values corresponding to the output variable 508 can be "accumulated" for use with "scorecard" style rule sets. A score card style rule set refers to a type of business rule where a user indicates a positive or negative score to be included into a rules value. Accordingly, rather than storing values corresponding to the output variable 508 as an output vector, a sum of the values that are accumulated corresponding to the output variable 508 is stored as a scalar value.

In some examples, the accumulator output variable 508 maps to a variable length vector or array for each record in the output dataset. As such, if the output variable 508 is treated as an array, the user can specify a size for the output variable 508. The user can specify a length of the output variable 508 by changing the Max Count 612 parameter. Accordingly, field 614 indicates that the output variable 508 is treated as an array for receiving a certain number (e.g., 20) of values. In some examples, in the absence of a user-specified size, by default, the output variable 508 can receive unlimited number of values. As such, the Max Count 612 parameter indicates, for example, "unlimited." In some examples, to help distinguish accumulator type output variables from write-once type output variables, the editor can prohibit users from editing the Max Count 612 parameter for a write-once variable. In some examples, if the user switches from an accumulator output variable to a write-once output variable, the editor can clear the Max Count 612 parameter.

FIG. 7 is an example rule tab 700 showing a fire many rule set, e.g., "Validate Person." Accumulator output variables 708 are visually distinguished from write-once outputs 712 by the annotation "Write-Once Outputs" or "Accumulator Outputs." In addition, various other annotations are possible. For example, a type of rule set, i.e., a "Fire-Many Rule" (rule which produce accumulator outputs), or a "Fire-Once Rule" (rule which produces a scalar output) may be indicated at the top 704 of the rule tab 700, or a vertical annotation 712 on one side indicates "Fire Once" or "Fire Many." In some examples, different icons may be used for fire once and fire many rules. In some examples, all of the rule cases that fired may be highlighted for inspection by the user.

Figure 8:
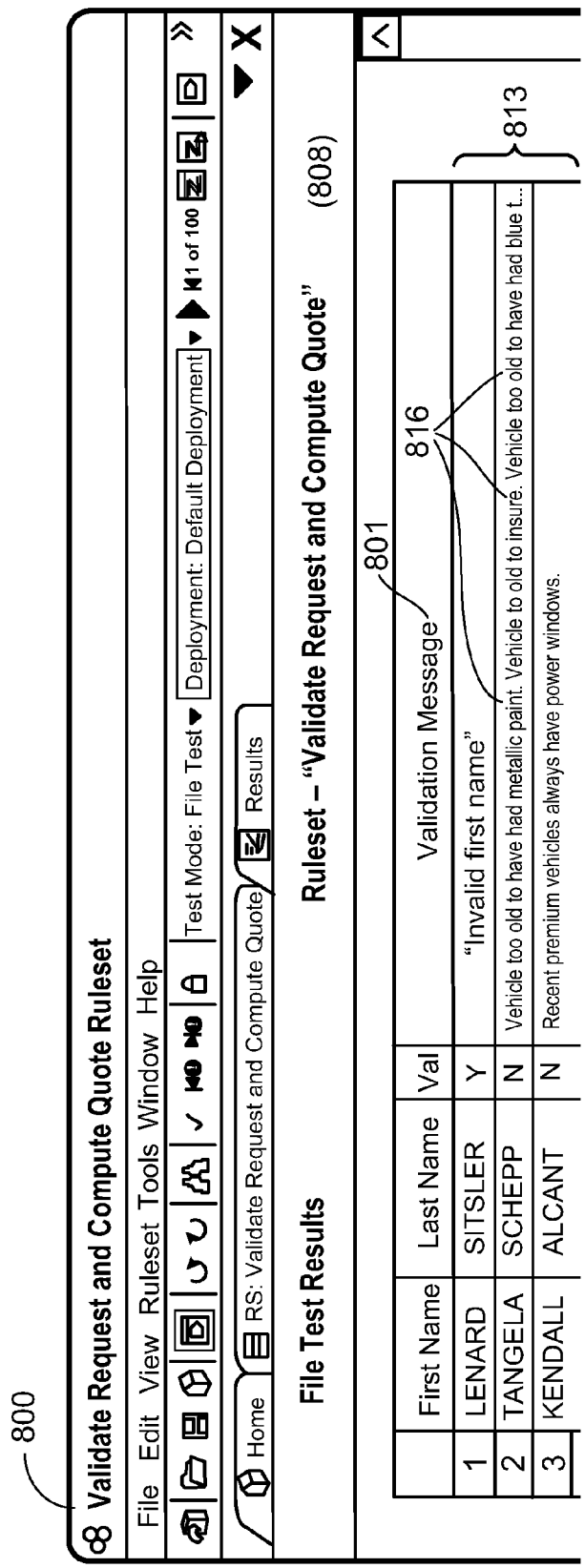

FIG. 8 is an example results tab 800 showing contents of the accumulator output variable 801, "Validation Message." As shown, the output variable 801 can assume a first series of values 813 for each record, and at least one of the values of the first series of values 813 (e.g., the value corresponding to "TANGELA SCHEPP") can assume a second series of values 816 that are displayed as a collection of comma separated values. In some examples, a user can "hover" a mouse pointer over an accumulator output value to uncover a tool tip showing a list of accumulated values. In some examples, when performing a test including, for example, benchmark data, an output can be marked as being different if a vector in the benchmark data differs from the vector in the output in any way. For example, differences can include, the benchmark vector having a different number of items than the output vector, the benchmark vector having items in a different order than the output vector, and individual items within each of the vectors being different.

In operation, an accumulator output variable is used for receiving multiple output values produced by a Fire-Many rule set as described below. For example, consider the following rule set shown in Table 2:

TABLE 2

| Trigger: Budget | Trigger: Family Size | Output: Automobile Option |
|---|---|---|
| >=35000 | <=2 | Honda S2000 |
| >=22000 | <=2 | Honda Accord Coupe |
| >=20000 | <=4 | Honda Accord Sedan |
| >=15000 | <=4 | Honda Civic Sedan |
| >=20000 | <=6 | Honda Element |
| >=28000 | <=7 | Honda Odyssey |
| >=50000 | <=4 | Acura RL |

The rule set above considers, for example, a family size of 4 and a budget of $20,000, to suggest three cars (Accord Sedan, Civic and Element). Accordingly, in this case, an output variable "Automobile Option" in an output dataset is deemed to be able to receive multiple values. Each rule case in the rule set is evaluated and any time a rule case triggers, a value from the rule set above is added to the accumulator output variable.

The triggers in the rule set above can be any scalar variables (non-vectors) including input values, lookups and other output values. In some examples, an output variable can compute another output variable. In some examples, only a non-vector output can be used as a trigger. In some examples, it is possible to indirectly use one accumulator output variable to compute another accumulator output variable by using the aggregation functions. For example, consider the following rule set shown in Table 3:

TABLE 3

| Trigger | Output: Family Members |
| --- | --- |
| is_alive | Self |
| is_married and not is_separated | Spouse |
| has_baby | Baby |
| has_teenage_girl | Daughter |
| has_teenage_boy | Son |

The rule set above computes an accumulator output variable called "Family Members." Now, consider the following rule set shown in Table 4:

TABLE 4

| Output: Family Size |
| --- |
| count_of(Family Members) |

The rule set in Table 4 computes a scalar (non-vector) called "Family Size," using an aggregation function. Accordingly, first, an output vector is computed that includes a list of all our family members. Then, a count function counts the number of people in the list. The count is then used as input to compute a list of automobiles.

Figure 9:
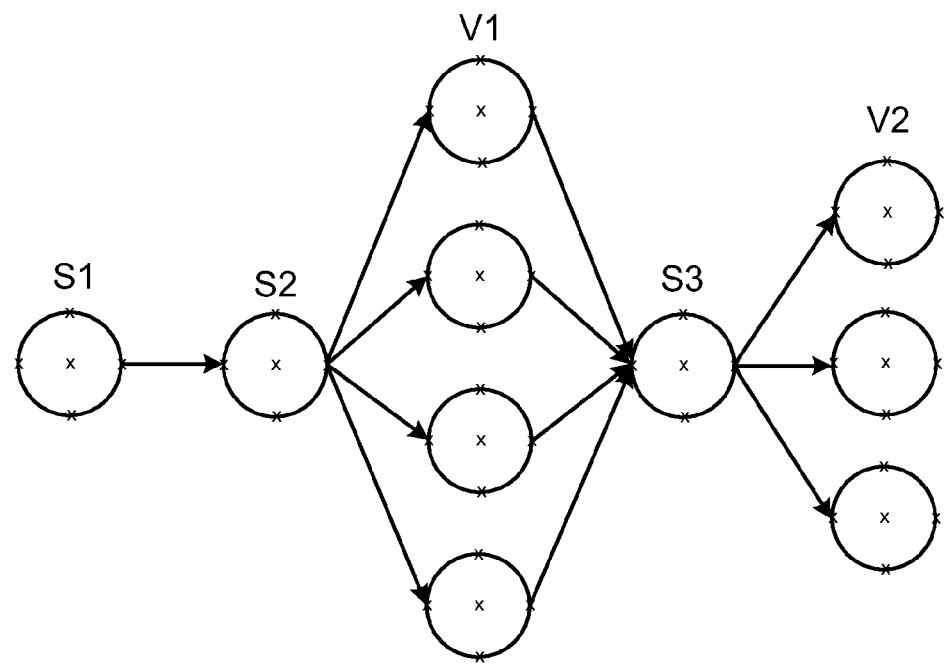
FIG. 9 is a schematic depicting computation of scalars and vectors.

FIG. 9 illustrates an example implementation using scalars and vectors to compute values for other scalar and vectors using an accumulator output variable. As shown, S1, S2 and S3 represent scalar variables. V1 and V2 represent vector variables. S1 is used to compute S2; then S2 is used to compute four different values of V1. Then all four values of V1 are used to compute S3 (e.g., through the use of an aggregation function). Finally, S3 is used to compute three values of V2.

In some implementations, the editor can produce validation errors when the user attempts to carry out any of the following example actions: Marking an output as an accumulator when the type of the field in any of the datasets is anything other than a variable length vector; mark an output as "write-once" when the type of the field in any of the datasets is a vector; provide a default value for an accumulator (in an implementation in which only write-once outputs can have default-values), use an accumulator output as a comparison trigger column; mix accumulator and write-once outputs within a single rule; and input a value other than unlimited or a positive number in the Max Count parameter of an accumulator output variable.

In some examples, input records can include vectors. FIG. 10A is an example format of an input record 950 that includes at least two vectors records, i.e., driver record vector 952, and vehicle record vector 954. FIG. 10B shows example data 956 for the input record 950.

An aggregation function can be included in a rule set to convert the record vectors 952, 954 into scalars. For example, the rule set can include a specification "Age of youngest driver." In some implementations, the specification is expressed as "minimum (DriverAge)," or a data manipulation language (DML) function such as "do_minimum (in0.drivers, 'age')" can be used. In response to the rule set, a scalar value is produced, e.g., 21 (from Pebbles' record in FIG. 10B) In some examples, in operation, a function can loop through all the records in the driver record vector 952 to find the minimum value for driver age.

Considering another example, the specification in a rule set can be "Number of points plus one for the youngest male driver." The specification can be expressed as "minimum (Driver Age, Driver Sex=Male, Driver Points+1)." In response to this rule set, a scalar value is produced, e.g., 14 (from BamBam's record). In some implementations, the scalar values can be assigned to intermediate or output variables, which are scalars.

In some examples, a rule can be written for each element in a record vector. For example, consider the following rule set shown in Table 5:

TABLE 5

| Vehicle has Air Bag (trigger) | Vehicle has Seat Belts (trigger) | Value Adjustment (output) |
| --- | --- | --- |
| no | No | 0 |
| no | Yes | 100 |
| yes | No | 150 |
| yes | Yes | 300 |

The specification in the rule set of Table 5 is "For each car, compute the adjustment to the car's value, which is 100 if the car has seat belts, 150 if the car has air bags, and 300 if the car has both." As shown, the output variable "Value Adjustment" is a vector variable. In response to the above rule, a vector, e.g., [0, 300, 100] is produced. In some examples, in operation, the rule set is executed multiple times, once for every record in the vehicle record vector 954.

In some examples, the rule set can also reference scalar values, or other vectors as long as the vectors are of the same length. For example, consider the following rule set shown in Table 6:

TABLE 6

| Vehicle Age (trigger) | Adjusted Value (output) |
| --- | --- |
| >2 | Vehicle Value + Value Adjustment + Geographic Adjustment − 50 |
| else | Vehicle Value + Value Adjustment + Geographic Adjustment |

The specification in the rule set of Table 6 is "For each car, compute the adjusted value, which is the sum of the car's value, its value adjustment and the geographic risk. Subtract 50 if the car is older than 2 years." In this rule, "Adjusted Value" is a vector variable. Accordingly, to avoid a runtime error due to unequal vector lengths, the vector variable "Value Adjustment" is of same length as the vehicle record vector 954. In response to this rule set, a vector, e.g., [1030, 1880, 1330] is produced.

In some examples, when XML records are complex, a single input record can be used to represent many logical records by relating them with key relationships. For example, each vehicle sub-record in the vehicle record vector 954 can include a foreign key, e.g., "driver," to relate to a matching key in the driver record vector 952, e.g., "name." In this manner, the record vectors 952, 954 can be implemented as look-up file, or an internal reference table. For example, an internal reference table associated with the vehicle record vector 954 can be as follows:

Primary Driver Name (primary key)

Primary Driver Age

Primary Driver Sex

Primary Driver Points

Accordingly, internal reference tables, can be created for each input record by treating the sub-records in the record vectors as records in the internal reference tables. In operation, consider for example, a rule set shown in Table 7:

TABLE 7 output: Age of Policy Driver
Primary Driver Age (Policy Driver)

The specification in the rule set of Table 7 is "Compute the Age of the Policy Driver, which is the Primary Driver Age found by using the value of Policy Driver as the key for the associated internal reference table." The specification returns the value in the Primary Driver Age column, which is then assigned to the output variable, "Age of Policy Driver." "Age of Policy Driver" is a scalar value. In another example, consider the rule set shown in Table 8 below:

TABLE 8

Age at Purchase (output)
Primary Driver Age-Vehicle Age

The specification in the rule set of Table 8 is "Compute the Age at Purchase, which is the difference between the vehicle's age and the age of the vehicle's primary driver." For purposes of illustration, assume that the look-up key is assigned "Vehicle Primary Driver" by default. The output variable "Age at Purchase" is a vector variable. Accordingly, in response to the above rule, [31, 19, 27] is produced.

In some examples, the look-up key "Vehicle Primary Driver" can be specified explicitly in parentheses as follows "Primary Driver Age (Vehicle Primary Driver)–Vehicle Age.

In some examples, the internal reference tables can be used in aggregation functions. For example, a specification can be "Compute the average over all the vehicles of the age of their primary drivers." This specification can be implemented by the function, for example, "average (Primary Driver Age (Vehicle Primary Driver))." In response to this function, a scalar value is produced, e.g., 29.67.

In some implementations, a user can visualize the computations steps in the above rule sets. For example, in testing mode, it may be useful for a user to be able to examine values of interest, e.g., intermediate values of input and output variables (both scalar and vector variables). Various techniques for visualizing the steps known in the art can be used. For example, a pop-up table having a row for each element in the input record vector 952, 954 can be implemented to summarize the intermediate values indicating what items have been filtered out, or computed.

The techniques described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for automated transformation of data, the method including:
   receiving, in a user interface, a rule having at least one rule case for producing output values for output variables based on one or more input values,
   generating, using at least one processor, a transform for transforming input data received from an input dataset based on the rule, the input dataset including a plurality of input records, at least one input record including a first series of input values, at least one input value in the first series of input values including a second series of input values where transforming the input data based on the rule includes producing a first series of output values for at least one output variable in an output dataset, at least one output value in the first series of output values including a second series of output values, and
   storing, in a data storage system, an output dataset that includes output records, wherein at least one output record provides a plurality of fields for storing the first series of output values, including providing at least one vector output field corresponding to the at least one output variable in the output dataset for storing the second series of values.

2. The method of claim 1 in which the transform is included in a component of a graph-based application represented by a graph, with vertices in the graph representing components, and directed links between vertices in the graph represent flows of data between components.

3. The method of claim 2 in which a first graph component including the transform provides a flow of data to the transform from the input dataset.

4. The method of claim 3 in which the first graph component is an executable computation component, and the graph includes a second graph component that is a data storage component representing the input dataset.

5. The method of claim 1 in which storing the output dataset includes storing rows for an output table, each row defining an output record having values for the plurality of fields.

6. The method of claim 1 in which providing at least one vector output field for storing the second series of output values includes providing an array for storing a predetermined number of the second series of output values, the predetermined number being a default number that is modifiable to a user-specified number.

7. The method of claim 1 in which the vector output field includes a cell in a table.

8. The method of claim 1 in which receiving the rule includes receiving a rule that includes at least a row of a rule table, the row corresponding to a rule case, and having an output including one or more or a combination of the input values, a predetermined value, or a value computed from one or more of the input values.

9. The method of claim 8 in which the rule case includes one or more of: having an input value equal to a threshold, having an input value above a threshold, having an input value below a threshold, having an input value belonging to a set of values, having an input value matching a pattern of values, having a relationship to another input value, having a relationship to an output value of another set of rules, or having a relationship to a value in a memory.

10. The method of claim 1 in which the input dataset includes input records having values for scalar variables and vector variables.

11. The method of claim 10 in which at least one of the input records includes an array for storing a predetermined number of input records, the predetermined number being a default number that is modifiable to a user-specified number 12. The method of claim 10 in which at least one of the input records includes an internal reference table to define key relationships to sub-records in the at least one of the input records.

13. The method of claim 12 also including, in response to applying the transform, producing the second series of output values for the output variable in the output dataset based on the key relationships in the internal reference table.

14. The method of claim 1 also including, in response to a rule case in a rule, triggering the rule case to produce a value for the output variable in the output dataset.

15. The method of claim 14 in which triggering the rule case includes triggering the rule case based on a scalar value in the input dataset satisfying the at least one rule case in the rule.

16. The method of claim 14 in which triggering the rule case includes triggering the rule case based on each value in a vector in the input dataset satisfying the at least one rule case in the rule.

17. The method of claim 14 in which triggering the rule case includes triggering the rule case based on an output of an aggregate function applied to a vector in the input dataset satisfying the at least one rule case in the rule.

18. The method of claim 1 in which generating the transform includes converting each of a plurality of rule cases in the rule to a logical expression to form a plurality of logical expressions, and compiling the plurality of logical expressions into computer-executable code.

19. The method of claim 18 in which compiling the plurality of logical expressions includes one or more of combining expressions, optimizing individual expressions, and optimizing groups of expressions.

20. A non-transitory computer-readable medium, storing a computer program for automated transformation of data, the computer program including instructions for causing a computer to:
  receive, in a user interface, a rule having at least one rule case for producing output values for output variables based on one or more input values,
  generate, using at least one processor, a transform for transforming input data received from an input dataset based on the rule, the input dataset including a plurality of input records, at least one input record including a first series of input values, at least one input value in the first series of input values including a second series of input values where transforming the input data based on the rule includes producing a first series of output values for at least one output variable in an output dataset, at least one output value in the first series of output values including a second series of output values, and
  storing, in a data storage system, an output dataset that includes output records, wherein at least one output record provides a plurality of fields for storing the first series of output values, including providing at least one vector output field corresponding to the at least one output variable in the output dataset for storing the second series of values.

21. A computing system for automated transformation of data, the system including:
  a user interface configured to receive a rule having at least one rule case for producing output values for output variables based on one or more input values,
  at least one processor configured to generate a transform for transforming input data received from an input dataset based on the rule, the input dataset including a plurality of input records, at least one input record including a first series of input values, at least one input value in the first series of input values including a second series of input values where transforming the input data based on the rule includes producing a first series of output values for at least one output variable in an output dataset, at least one output value in the first series of output values including a second series of output values, and
  a data storage system configured to store an output dataset that includes output records, wherein at least one output record provides a plurality of fields for storing the first series of output values, including providing at least one vector output field corresponding to the at least one output variable in the output dataset for storing the second series of values.

22. A computing system for automated transformation of data, the system including:
  means for receiving a rule having at least one rule case for producing output values for output variables based on one or more input values,
  means for generating a transform for transforming input data received from an input dataset based on the rule, the input dataset including a plurality of input records, at least one input record including a first series of input values, at least one input value in the first series of input values including a second series of input values where transforming the input data based on the rule includes producing a first series of output values for at least one output variable in an output dataset, at least one output value in the first series of output values including a second series of output values, and
  means for storing an output dataset that includes output records, wherein at least one output record provides a plurality of fields for storing the first series of output values, including providing at least one vector output field corresponding to the at least one output variable in the output dataset for storing the second series of values.

23. A method for automated transformation of data using instructions generated for said transformation, the method including:
receiving, in a user interface, a specification for producing output values for output variables based on one or more input values; and
generating, using at least one processor, instructions for transforming input data according to the specification, the input data including a first series of input values for at least one input record, and at least one input value in the first series of input values including a second series of input values, where transforming the input data includes producing a first series of output values for at least one output variable, at least one output value in the first series of output values including a second series of output values.

24. The method of claim 23, further including storing, in a data storage system, an output dataset that includes output records corresponding to at least one output variable, at least one output record including a plurality of fields for storing the first series of output values including at least one vector output field for storing the second series of output values.

25. The method of claim 23 in which the instructions are included in a component of a graph-based application represented by a graph, with vertices in the graph representing components, and directed links between vertices in the graph represent flows of data between components.

26. The method of claim 25 in which a first graph component including the instructions provides a flow of data to the instructions from an input dataset.

27. The method of claim 26 in which the first graph component is an executable computation component, and the graph includes a second graph component that is a data storage component representing the input dataset.

28. The method of claim 23 in which storing the output dataset includes storing rows for an output table, each row defining an output record having values for the plurality of fields.

29. The method of claim 23 in which providing at least one vector output field for storing the second series of output values includes providing an array for storing a predetermined number of the second series of output values, the predetermined number being a default number that is modifiable to a user-specified number.

30. The method of claim 23 in which the vector output field includes a cell in a table.

31. The method of claim 23 in which receiving the specification includes receiving a rule that includes at least a row of a rule table, the row corresponding to a rule case, and having an output including one or more or a combination of the input values, a predetermined value, or a value computed from one or more of the input values.

32. The method of claim 31 in which the rule case includes one or more of: having an input value equal to a threshold, having an input value above a threshold, having an input value below a threshold, having an input value belonging to a set of values, having an input value matching a pattern of values, having a relationship to another input value, having a relationship to an output value of another set of rules, or having a relationship to a value in a memory.

33. The method of claim 31 also including, in response to a rule case in a rule, triggering the rule case to produce a value for the output variable.

34. The method of claim 33 in which triggering the rule case includes triggering the rule case based on an output of an aggregate function applied to a vector in the input data satisfying the at least one rule case in the rule.

35. The method of claim 23 in which the input data includes input records having values for scalar variables and vector variables.

36. The method of claim 35 in which at least one of the input records includes an array for storing a predetermined number of input records, the predetermined number being a default number that is modifiable to a user-specified number.

37. The method of claim 35 in which at least one of the input records includes an internal reference table to define key relationships to sub-records in the at least one of the input records.

38. The method of claim 37 also including, in response to transforming the input data, producing the second series of output values for the output variable based on the key relationships in the internal reference table.

39. The method of claim 23 in which generating the instructions includes converting at least a portion of the specification to a plurality of logical expressions, and compiling the plurality of logical expressions into computer-executable code.

40. The method of claim 39 in which compiling the plurality of logical expressions includes one or more of combining expressions, optimizing individual expressions, and optimizing groups of expressions.

41. A non-transitory computer-readable medium, storing a computer program for automated transformation of data using instructions generated for said transformation, the computer program including instructions for causing a computer to:
receive, in a user interface, a specification for producing output values for output variables based on one or more input values; and
generate, using at least one processor, instructions for transforming input data according to the specification, the input data including a first series of input values for at least one input record, and at least one input value in the first series of input values including a second series of input values, where transforming the input data includes producing a first series of output values for at least one output variable, at least one output value in the first series of output values including a second series of output values.

42. The medium of claim 41, the computer program including instructions for causing a computer to store, in a data storage system, an output dataset that includes output records corresponding to at least one output variable, at least one output record including a plurality of fields for storing the first series of output values including at least one vector output field for storing the second series of output values.

43. The medium of claim 41 in which the instructions are included in a component of a graph-based application represented by a graph, with vertices in the graph representing components, and directed links between vertices in the graph represent flows of data between components.

44. The medium of claim 43 in which a first graph component including the instructions provides a flow of data to the instructions from an input dataset.

45. The medium of claim 44 in which the first graph component is an executable computation component, and the graph includes a second graph component that is a data storage component representing the input dataset.

46. The medium of claim 41 in which storing the output dataset includes storing rows for an output table, each row defining an output record having values for the plurality of fields.

47. The medium of claim 41 in which providing at least one vector output field for storing the second series of output values includes providing an array for storing a predetermined number of the second series of output values, the predetermined number being a default number that is modifiable to a user-specified number.

48. The medium of claim 41 in which the vector output field includes a cell in a table.

49. The medium of claim 41 in which receiving the specification includes receiving a rule that includes at least a row of a rule table, the row corresponding to a rule case, and having an output including one or more or a combination of the input values, a predetermined value, or a value computed from one or more of the input values.

50. The medium of claim 49 in which the rule case includes one or more of: having an input value equal to a threshold, having an input value above a threshold, having an input value below a threshold, having an input value belonging to a set of values, having an input value matching a pattern of values, having a relationship to another input value, having a relationship to an output value of another set of rules, or having a relationship to a value in a memory.

51. The medium of claim 49, the computer program including instructions for causing a computer to, in response to a rule case in a rule, trigger the rule case to produce a value for the output variable.

52. The medium of claim 51 in which triggering the rule case includes triggering the rule case based on an output of an aggregate function applied to a vector in the input data satisfying the at least one rule case in the rule.

53. The medium of claim 41 in which the input data includes input records having values for scalar variables and vector variables.

54. The medium of claim 53 in which at least one of the input records includes an array for storing a predetermined number of input records, the predetermined number being a default number that is modifiable to a user-specified number.

55. The medium of claim 53 in which at least one of the input records includes an internal reference table to define key relationships to sub-records in the at least one of the input records.

56. The medium of claim 55, the computer program including instructions for causing a computer to, in response to transforming the input data, produce the second series of output values for the output variable based on the key relationships in the internal reference table.

57. The medium of claim 41 in which generating the instructions includes converting at least a portion of the specification to a plurality of logical expressions, and compiling the plurality of logical expressions into computer-executable code.

58. The medium of claim 57 in which compiling the plurality of logical expressions includes one or more of combining expressions, optimizing individual expressions, and optimizing groups of expressions.

59. A computing system for automated transformation of data using instructions generated for said transformation, the system including:
a user interface configured to receive a specification for producing output values for output variables based on one or more input values; and
at least one processor configured to generate instructions for transforming input data according to the specification, the input data including a first series of input values for at least one input record, and at least one input value in the first series of input values including a second series of input values, where transforming the input data includes producing a first series of output values for at least one output variable, at least one output value in the first series of output values including a second series of output values.

60. The system of claim 59, further including a data storage system storing an output dataset that includes output records corresponding to at least one output variable, at least one output record including a plurality of fields for storing the first series of output values including at least one vector output field for storing the second series of output values.

61. The system of claim 59 in which the instructions are included in a component of a graph-based application represented by a graph, with vertices in the graph representing components, and directed links between vertices in the graph represent flows of data between components.

62. The system of claim 61 in which a first graph component including the instructions provides a flow of data to the instructions from an input dataset.

63. The system of claim 62 in which the first graph component is an executable computation component, and the graph includes a second graph component that is a data storage component representing the input dataset.

64. The system of claim 59 in which the input data includes input records having values for scalar variables and vector variables.

65. The system of claim 64 in which at least one of the input records includes an array for storing a predetermined number of input records, the predetermined number being a default number that is modifiable to a user-specified number.

66. The system of claim 64 in which at least one of the input records includes an internal reference table to define key relationships to sub-records in the at least one of the input records.

67. The system of claim 66 where transforming the input data includes producing the second series of output values for the output variable based on the key relationships in the internal reference table.

68. A computing system for automated transformation of data using instructions generated for said transformation, the system including:
means for receiving a specification for producing output values for output variables based on one or more input values; and
means for generating instructions for transforming input data according to the specification, the input data including a first series of input values for at least one input record, and at least one input value in the first series of input values including a second series of input values, where transforming the input data includes producing a first series of output values for at least one output variable, at least one output value in the first series of output values including a second series of output values.

69. The system of claim 68, further including means for storing an output dataset that includes output records corresponding to at least one output variable, at least one output record including a plurality of fields for storing the first series of output values including at least one vector output field for storing the second series of output values.

70. The system of claim 68 in which the instructions are included in a component of a graph-based application represented by a graph, with vertices in the graph representing components, and directed links between vertices in the graph represent flows of data between components.

71. The system of claim 70 in which a first graph component including the instructions provides a flow of data to the instructions from an input dataset.

72. The system of claim 71 in which the first graph component is an executable computation component, and the graph includes a second graph component that is a data storage component representing the input dataset.

73. The system of claim 68 in which the input data includes input records having values for scalar variables and vector variables.

74. The system of claim 73 in which at least one of the input records includes an array for storing a predetermined number of input records, the predetermined number being a default number that is modifiable to a user-specified number.

75. The system of claim 73 in which at least one of the input records includes an internal reference table to define key relationships to sub-records in the at least one of the input records.

76. The system of claim 75 where transforming the input data includes producing the second series of output values for the output variable based on the key relationships in the internal reference table.

77. The medium of claim 20 in which the transform is included in a component of a graph-based application represented by a graph, with vertices in the graph representing components, and directed links between vertices in the graph represent flows of data between components.

78. The medium of claim 77 in which a first graph component including the transform provides a flow of data to the transform from the input dataset.

79. The medium of claim 78 in which the first graph component is an executable computation component, and the graph includes a second graph component that is a data storage component representing the input dataset.

80. The medium of claim 20 in which storing the output dataset includes storing rows for an output table, each row defining an output record having values for the plurality of fields.

81. The medium of claim 20 in which providing at least one vector output field for storing the second series of output values includes providing an array for storing a predetermined number of the second series of output values, the predetermined number being a default number that is modifiable to a user-specified number.

82. The medium of claim 20 in which the vector output field includes a cell in a table.

83. The medium of claim 20 in which receiving the rule includes receiving a rule that includes at least a row of a rule table, the row corresponding to a rule case, and having an output including one or more or a combination of the input values, a predetermined value, or a value computed from one or more of the input values.

84. The medium of claim 83 in which the rule case includes one or more of: having an input value equal to a threshold, having an input value above a threshold, having an input value below a threshold, having an input value belonging to a set of values, having an input value matching a pattern of values, having a relationship to another input value, having a relationship to an output value of another set of rules, or having a relationship to a value in a memory.

85. The medium of claim 20 in which the input dataset includes input records having values for scalar variables and vector variables.

86. The medium of claim 85 in which at least one of the input records includes an array for storing a predetermined number of input records, the predetermined number being a default number that is modifiable to a user-specified number 87. The medium of claim 85 in which at least one of the input records includes an internal reference table to define key relationships to sub-records in the at least one of the input records.

88. The medium of claim 87, the computer program including instructions for causing a computer to, in response to applying the transform, produce the second series of output values for the output variable in the output dataset based on the key relationships in the internal reference table.

89. The medium of claim 20 also including, in response to a rule case in a rule, triggering the rule case to produce a value for the output variable in the output dataset.

90. The medium of claim 89 in which triggering the rule case includes triggering the rule case based on a scalar value in the input dataset satisfying the at least one rule case in the rule.

91. The medium of claim 89 in which triggering the rule case includes triggering the rule case based on each value in a vector in the input dataset satisfying the at least one rule case in the rule.

92. The medium of claim 89 in which triggering the rule case includes triggering the rule case based on an output of an aggregate function applied to a vector in the input dataset satisfying the at least one rule case in the rule.

93. The medium of claim 20 in which generating the transform includes converting each of a plurality of rule cases in the rule to a logical expression to form a plurality of logical expressions, and compiling the plurality of logical expressions into computer-executable code.

94. The medium of claim 93 in which compiling the plurality of logical expressions includes one or more of combining expressions, optimizing individual expressions, and optimizing groups of expressions.

95. The system of claim 21 in which the transform is included in a component of a graph-based application represented by a graph, with vertices in the graph representing components, and directed links between vertices in the graph represent flows of data between components.

96. The system of claim 95 in which a first graph component including the transform provides a flow of data to the transform from the input dataset.

97. The system of claim 96 in which the first graph component is an executable computation component, and the graph includes a second graph component that is a data storage component representing the input dataset.

98. The system of claim 21 in which the input dataset includes input records having values for scalar variables and vector variables.

99. The system of claim 98 in which at least one of the input records includes an array for storing a predetermined number of input records, the predetermined number being a default number that is modifiable to a user-specified number 100. The system of claim 98 in which at least one of the input records includes an internal reference table to define key relationships to sub-records in the at least one of the input records.

101. The system of claim 100 where applying the transform includes producing the second series of output values for the output variable in the output dataset based on the key relationships in the internal reference table.

102. The system of claim 22 in which the transform is included in a component of a graph-based application represented by a graph, with vertices in the graph representing components, and directed links between vertices in the graph represent flows of data between components.

103. The system of claim 102 in which a first graph component including the transform provides a flow of data to the transform from the input dataset.

104. The system of claim 103 in which the first graph component is an executable computation component, and the graph includes a second graph component that is a data storage component representing the input dataset.

105. The system of claim 22 in which the input dataset includes input records having values for scalar variables and vector variables.

106. The system of claim 105 in which at least one of the input records includes an array for storing a predetermined number of input records, the predetermined number being a default number that is modifiable to a user-specified number 107. The system of claim 105 in which at least one of the input records includes an internal reference table to define key relationships to sub-records in the at least one of the input records.

108. The system of claim 107 where applying the transform includes producing the second series of output values for the output variable in the output dataset based on the key relationships in the internal reference table.

\* \* \* \* \*